Oct. 27, 1970  A. H. LINDQUIST ETAL  3,536,431
CONTROL DEVICE FOR WICKET GATES OF A TURBINE INSTALLATION
Filed June 6, 1967  2 Sheets-Sheet 1
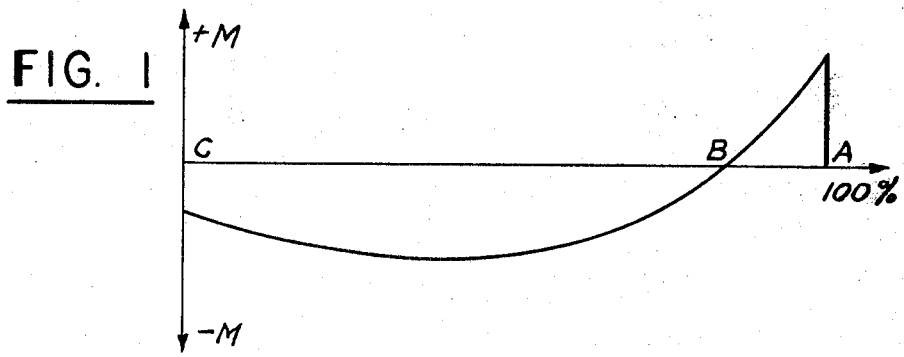
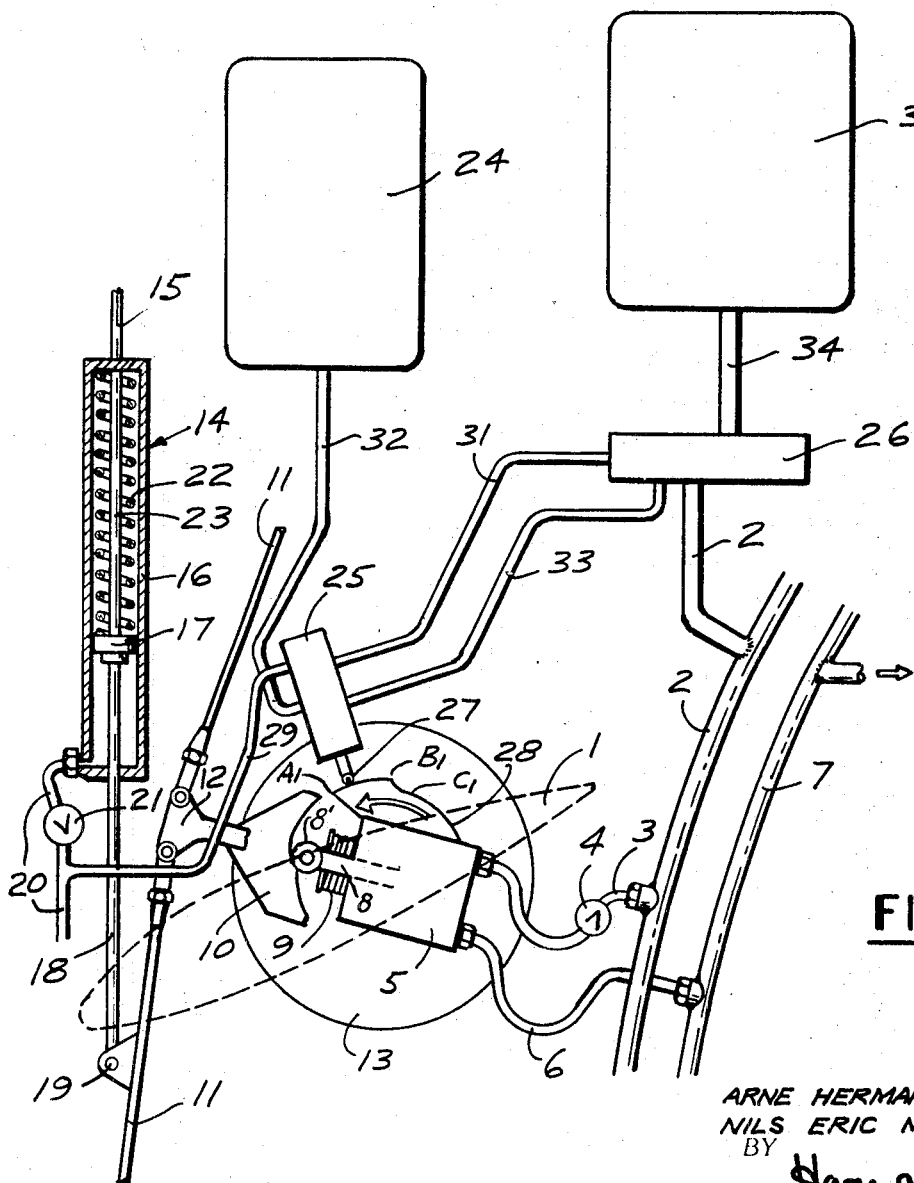
INVENTORS
ARNE HERMAN LINDQUIST
NILS ERIC MUNKSTRAND
BY
Hare and Bayley
ATTORNEYS INVENTORS
ARNE HERMAN LINDQUIST
NILS ERIC MUNKSTRAND
BY
Hanes and Bayley
ATTORNEYS

United States Patent Office 3,536,431
Patented Oct. 27, 1970

3,536,431
CONTROL DEVICE FOR WICKET GATES OF A TURBINE INSTALLATION
Arne Herman Lindquist and Nils Eric Munkstrand, Trollhattan, Sweden, assignors to Nydqvist & Holm Aktiebolag, Trollhattan, Sweden, a corporation of Sweden
Filed June 6, 1967, Ser. No. 643,936
Claims priority, application Sweden, June 6, 1966, 7,714/66
Int. Cl. F16b 13/02
U.S. Cl. 251—26      2 Claims

ABSTRACT OF THE DISCLOSURE

There is disclosed a control device for controlling the position of wicket gates exposed in operation to a fluid flow in a turbine installation of the kind in which the wicket gates of the turbine within a predetermined angular range thereof are subjected to hydrodynamic forces biasing the gates toward the open position. The device prevents movement of the gates into the open position when the same are within the aforesaid turning range and the fluid pressure flow fails for any reason, by automatically switching the pressure fluid conduits of the installation from the normal supply source to an auxiliary or emergency supply source.

---

The present invention relates to devices of the type disclosed in our copending U.S. patent application No. 498,753/1965, filed Oct. 20, 1965 now Pat. 3,385,558, for closing the wicket gates in e.g., water turbine installations in response to losses of pressure in the hydraulic system controlling the position of the wicket gates. More particularly, the invention relates to devices in which the wicket gates are so designed that within a predetermined angle of their turning movement they are subjected to hydrodynamic forces which produce a torque tending to turn the wicekt gates toward opening.

In certain installations it may be desirable to design the wicket gates so that within a selected small angle of the turning movement of the wicket gates they are subjected to hydrodynamic forces which produce a torque tending to turn the wicket gates toward opening. A torque curve for wicket gates designed in such a way is shown in FIG. 1, which corresponds to FIG. 4 in the aforesaid U.S. patent application. Within the range A-B, that is, near a complete opening of the wicket gates, the gates unless controlled in some way, will be turned to full opening by the hydrodynamic forces. Such a turning has the effect that the speed of the turbine will increase, and it will have an overspread which, of course, entails considerable disadvantages. This problem has been solved by the present invention.

The invention will now be described in more detail with reference to an embodiment of the device according to the invention.

Figure 3:
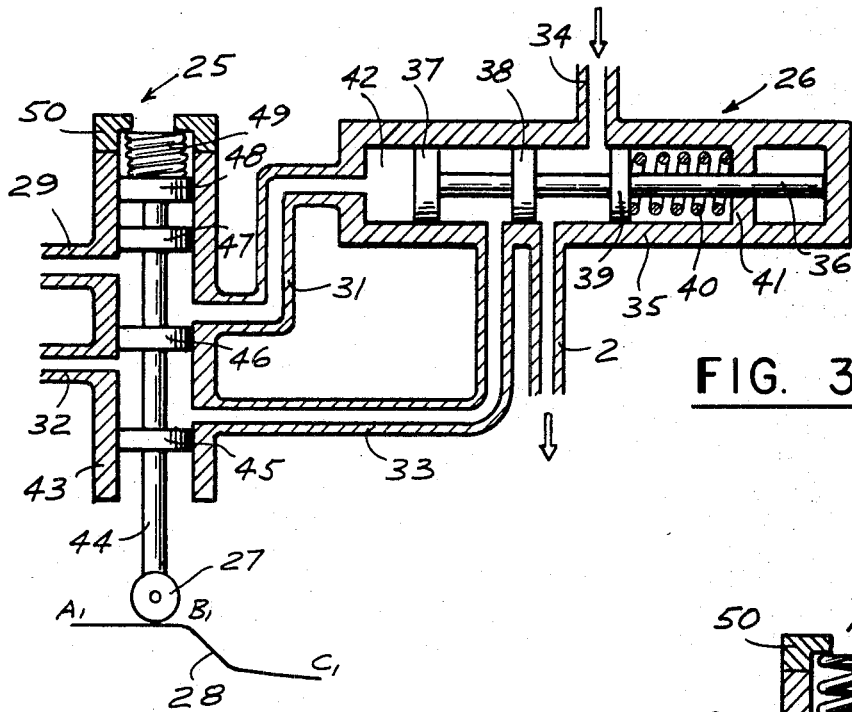
Figure 4:
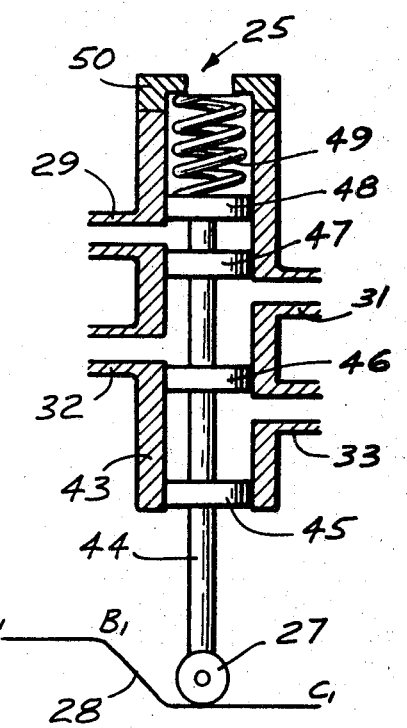
Figure 5:
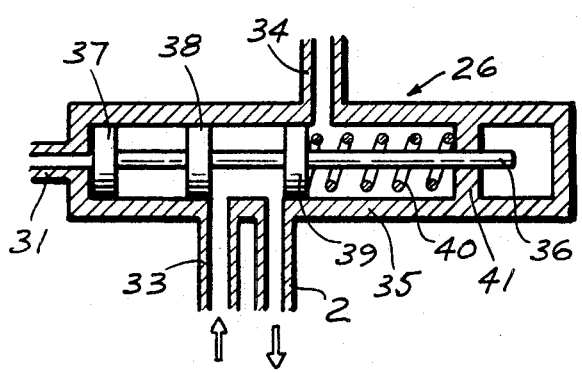

In the drawing:
FIG. 1 is a torque curve for opening and closing of the wicket gates made according to the present invention;
FIG. 2 shows the device in plan view and partly in a section;
FIG. 3 shows schematically a section of two of the valves comprised in the device;

FIG. 4 shows one of the valves shown in FIG. 3 in another position; and
FIG. 5 the other of the valves shown in FIG. 3 in another position.

FIG. 2 corresponds to FIG. 1 in U.S. Pat. 3,385,558 and the parts which directly correspond to said U.S. patent bear the same reference numerals.

In the embodiment described and illustrated in FIG. 2, there is used a system comprising a separate hydraulic servomotor for each gate. The valve housing of the valve controlling each motor is rigidly connected to the associated gate so that it follows the turning movement of the gate. This results in a complete uniformity of the turning movement and smooth operation of all the gates.

FIG. 2 shows a portion of the gate ring with one gate 1. High pressure oil is supplied through a main conduit 2 wherefrom a flexible tube 3 extends to each valve housing 5 through a check valve 4. The return oil flows through a flexible tube 6 to the main conduit 7. In the valve housing, an axial slide 8 mounting a roller 8' is provided. It is biased by a helical spring 9 and engages a cam 10. This cam is connected to a control chain consisting of links 11 which connect the levers 12 on which the cams are attached.

The type of servomotor herein used is a rotary piston motor. The valve housing 5 is rigidly connected to the rotary disc on the rotary piston servomotor 13, which in turn is rigidly connected to the gate.

An actuator member 14 in the form of a piston-cylinder device is provided on a control rod 15 belonging to the governor system of the turbine, said rod being rigidly connected to a cylinder 16 of the actuator. A piston 17 of the actuator is pivotally connected at 19 by a piston rod 18 to one of the links 11 of the control chain. The cylinder space which in operation is under a high oil pressure, is connected through a conduit 20 to an overspeed switch, a safety shutdown system or similar means over a reducing valve 21. The piston 17 is biased against the oil pressure by a helical spring 22. A stop member in the form of a rod 23 is provided at the spring side of the piston to limit compression of the spring 22 by the oil pressure.

In addition to the components of the device shown in FIG. 1 of U.S. Pat. 3,385,558, FIG. 2 of the present application shows a change-over valve 26 and a double closing control valve 25. A pressure dome 30 being part of a conventional hydraulic system for the installation is schematically shown, and also an additionial emergency pressure dome 24. A pipe 20 is connected via a pipe 29 with the double closing valve 25 which is also connected via a pipe 32 with the emergency pressure dome 24. The double closing valve 25 and the change-over valve 26 are connected by two pipes 31 and 33, and the change-over valve 26 is also connected to pressure dome 30 via a pipe 34. The double closing valve 25 is controlled by a control roller 27 riding on a cam 28, which turns in the same way as wicket gate 1 being mounted on servo-motor 13 turning in unison with wicket gate 1. On this cam 28, the points $A_1$, $B_1$ and $C_1$ are indicated, points $A_1$ and $B_1$ corresponding to points A and B, respectively, in the torque curve shown in FIG. 1 for the movement of the wicket gate. The surface portion $A_1B_1$ of the cam has a shape such that the control roller 27 is at a greater distance from the turning center for turning the wicket gate 1 than after passing point $C_1$.

FIG. 3 shows diagrammatically change-over valve 26 and double closing valve 25. The change-over valve 26 comprises a valve housing 35 to which pipes 31, 34, 33 and 2 are connected. Inside the valve housing 35 a control slide is movable. The slide comprises a rod 36, and pistons 37, 38 and 39. Between piston 39 and a divider 41 a helical spring 40 biases the control slide into the direction toward the end of the valve housing to which pipe 31 is connected. Normally, however, pipe 31 and also chamber 42 in the valve housing 35 are under such high pressure that the force of the spring 40 is counteracted, and the valve slide is in the position shown in FIG. 3. Piston 38 then occupies a position such that pipes 34 and 2 are connected to each other, while pipes 33 and 2 are blocked off from each other. If the hydraulic pressure such as oil pressure in chamber 42 should disappear, the control slide is displaced into the position shown in FIG. 5. Piston 39 will then block the connection between pipes 34 and 2, while piston 38 occupies a position such that pipes 33 and 2 will become connected with each other.

As may be noted from FIG. 3, the double closing valve 25 comprises a valve housing 43 and a displaceable control slide in this valve housing, said slide including a rod 44 and pistons 45 and 48. A helical spring 49 acts against piston 48, and is retained in the valve housing by a turned-in sleeve 50. The end of rod 44 opposite to piston 48 mounts the control roller 27, which is pressed by spring 49 against cam 28. In the position shown in FIG. 3, the control roller and with it rod 44 and pistons 45 to 48 occupy a position compressing control spring 49. This position is dependent upon the control roller 27 being within the range $A_1B_1$ which, as previously mentioned, has a greater radius than the range defined by point $C_1$.

FIG. 4 also shows the position of the control slide arranged in double closing valve 25 when the control roller 27 is in the position corresponding to point $C_1$. Owing to the action of helical spring 49, rod 44 and pistons 45 to 48 arranged on it are then displaced in the direction away from sleeve 50, and pistons 46 and 47 will thereby block the previously open connection between pipes 29, 31 and 32 and 33, respectively.

As hereinbefore described, the device functions as follows:

If the wicket gate 1 has a position which corresponds to the range A–B in FIG. 1 and is shown in FIG. 2, the double closing valve 25 occupies the position shown in FIG. 3. In case of a loss of pressure at the wicket gate in this position, the impulse caused by the loss of pressure in pipe 20, will be propagated to chamber 42 of valve 26 via pipe 29, double-closing valve 25 and pipe 31. The control slide in the change-over valve 26 will then be displaced from the position shown in FIG. 3 to the position shown in FIG. 5, valve 25 remaining in the position of FIG. 3. This displacement of the control slide in the change-over valve 26 causes the main pressure dome 30 which is part of the hydraulic system of the installation to be disconnected from pipe 2 and instead the emergency pressure dome 24 is connected via pipe 32, valve 25, pipe 33 and valve 26 to main pipe 2 for supply of hydraulic oil. Such change-over also causes that if the pressure dome 30 by accident or malfunction of oil pumps etc. should lose its working pressure, the supply pipe 2 now being connected to the emergency pressure dome 24 via valve 26 is fed with high-pressure oil, whereby the wicket gates are turned toward closing, in spite of the fact that the hydrodynamic forces may be acting upon it in the opposite direction. Hence, it is assured that the wicket gates will be closed even if the hydraulic system of the installation should suddenly be left entirely without pressure.

If due to loss of pressure the wicket gates assume a position such that the hydrodynamic forces produce a torque acting toward closing of the wicket gates, that is, if they are within the range B–C in the torque curve shown in FIG. 1, no additional force from the hydraulic system is required to effect a closing of the wicket gates. in this case, the double-closing valve 25 moves into the position of FIG. 4 by the action of spring 49 thereby cutting off the feed of pressure oil from the emergency pressure dome 24 to valve 26 but opening the connection between pipes 32 and 31 so that valve 26 returns into the position of FIG. 3. Main pressure dome 30 is now connected to pipe 2 via pipe 34. If as previously assumed dome 30 is without pressure, this has no effect since the wicket gates are now presumed to be turned into the closed position by hydrodynamic pressure.

The change-over valve 26 may be provided with devices such that, for instance electro-magnetically, it effects a change-over action in response to impulses from, for instance, an overspeed guard, or some pressure-sensing member.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A control device for controlling the position of a wicket gate exposed in operation a fluid flow in a turbine installation of the kind in which the wicket gates of the turbine within a predetermined angular range thereof are subjected to hydrodynamic forces biasing the gates toward the open position, said device comprising in combination:

a wicket gate movable between an open position and a closed position and having a configuration such that in other positions the hydrostatic and hydrodynamic forces acting upon the gate when exposed to the operational fluid flow bias the gate into its closed position;

a hydraulic servomotor means operable by a flow of pressure fluid coupled to said gate, said servomotor means, when operated, retaining the gate in its open position against said forces;

a main supply source for pressure fluid;

an auxiliary supply source for pressure fluid;

a first conduit means for supplying pressure fluid to said servomotor means to activate the same;

a second conduit means connecting the main supply source to the first conduit means;

a third conduit means connecting the auxiliary supply source to the first conduit means;

a change-over valve means included in said conduit means, valve means being movable between a first position connecting the second conduit means to the first conduit means and a second position connecting the third conduit means to the first conduit means, and including spring means biasing the valve means into said second position;

fourth conduit means connected to the change-over valve means for supplying pressure fluid thereto, said supply of pressure fluid to the change-over valve means retaining said valve means in the first position against the action of said spring means, failure of the pressure fluid supply to the valve means through the fourth conduit means causing movement of the valve means into the second position by the action of the spring means and thus change-over of the connection of the first conduit means from the main supply source to the auxiliary supply source;

a double-closing valve means included in the third conduit means and the fourth conduit means, said valve means being movable between a first position opening the third conduit means and the fourth conduit means and a second position interconnecting the third conduit means and the fourth conduit means, and including spring means biasing said double-closing valve means into the second position; and control means retaining the double-closing valve means in the first position and controlled by the position of the wicket gate to release said double-closing valve means for movement into the second position.

2. The control device according to claim 1 wherein said hydraulic servomotor means comprises a control valve means included in said first conduit means for controlling the fluid flow therethrough; and wherein a hydraulic actuator means controls the position of said control valve means, said actuator means being movable between a first position opening the control valve means and a second position causing closing of said valve means, and including a spring means biasing the actuator means into the second position, said fourth conduit means being also connected to the actuator means for holding the same in the first position against the action of said spring means, failure of pressure in the fourth conduit means causing the actuator means to move into the second position thereby closing the control valve means.

References Cited

UNITED STATES PATENTS 3,379,404   4/1968   Anderson _____ 251—26

ARNOLD ROSENTHAL, Primary Examiner